UNITED STATES PATENT OFFICE.

PAUL A. STARKE, OF BERKELEY, CALIFORNIA, ASSIGNOR TO THE BALFOUR-GUTHRIE INVESTMENT COMPANY, OF SAN FRANCISCO, CALIFORNIA, A CORPORATION OF CALIFORNIA.

METHOD OF PRODUCING CYANOGEN AND AMMONIA.

1,306,862. Specification of Letters Patent. Patented June 17, 1919.

No Drawing. Application filed July 26, 1917. Serial No. 182,930.

*To all whom it may concern:*

Be it known that I, PAUL A. STARKE, a citizen of the United States, residing at Berkeley, in the county of Alameda and State of California, have invented certain new and useful Improvements in Methods of Producing Cyanogen and Ammonia, of which the following is a specification.

My invention relates to the art of producing cyanogen and ammonia by catalysis. I have discovered that if a mixture of nitrogen with hydrogen, or with a carbon compound, such, for example, as carbon monoxid or a hydrocarbon be passed through a catalytic mass composed of a metal of the iron group, an alkaline earth and an alkali, at a relatively high temperature, say between 1500 and 1900 degrees Fahr. the catalytic mass is made so active that it is capable thereafter, at a relatively low temperature, say between 600 and 1200 degrees Fahr. of forming, with greatly increased yields either ammonia or cyanogen or both ammonia and cyanogen according to the gaseous mixture used.

As an example of a gaseous mixture comprising nitrogen and hydrogen I give nitrogen, one part and hydrogen three parts. Atmospheric air may be used as the source of nitrogen. This mixture when passed through the catalyzer under the conditions stated, that is, through the mass at the relatively lower range of temperature, said mass having been previously rendered specially active by subjection to the passage of the gaseous mixture at the relatively higher range of temperature will form ammonia which may be recovered by ordinary known methods.

As an example of a gaseous mixture comprising nitrogen and a carbon monoxid compound such as producer gas, I give atmospheric air 10% and producer gas, 90%.

This mixture when used with the catalyzer under the conditions stated will form cyanogen which may be recovered by known methods.

As an example of a gaseous mixture comprising nitrogen and a carbon compound such as a hydrocarbon, I give atmospheric air 40% and natural gas 60%.

This mixture used as stated will form simultaneously both ammonia and cyanogen. These may be separated and converted into such other combinations as may be desired, by known methods, as, for example, by passing the gas as it comes from the furnace through potassium or sodium hydrate or other solvent for cyanogen, and then removing the ammonia with an acid.

This last named mixture, namely nitrogen and a hydrocarbon is especially desirable in practice, because at the higher temperature, a small percentage of a cyanogen compound is formed in the catalyzer, the presence of which gives to it at the lower temperature such marked activity that the maximum yield of cyanogen and ammonia is obtained, a yield which in practice is approximately 5% of the gas mixture used.

With regard to the hydrocarbon, I prefer to use one of the methane series, as for example, natural gas, because of its cheapness and the large content of hydrogen.

With regard to the catalyzer, the ingredients are, generally defined, a metal of the so-called iron group, an alkaline earth and an alkali.

The metal may be iron, nickel or cobalt. I prefer iron. The iron may be metallic or some combination such as the oxid or carbonate. An efficient form of iron is that resulting from the decomposition of the iron cyanogen compounds.

The alkaline earth may be magnesium oxid, calcium oxid or barium oxid.

The alkali may be sodium or potassium oxid or hydroxid or carbonate, but organic acid salts, such as the acetate or oxalate may be used.

An example of the catalyzer is this:—

Iron filings _____ 30% by weight
Calcium oxid _____ 50% by weight
Sodium hydroxid __ 20% by weight These are mixed together and thoroughly incorporated in a Chile mill, sufficient water being added to render the mass plastic. Instead of water, syrup or other binder may be used. After a thorough mixing it is best briqueted, and then roasted, to remove all moisture and to burn out all carbon. The mixture is then run through a machine and reduced to proper size, which should be about 20 mesh. The catalyzer is then ready for use.

I do not, however, confine myself to the preparation of the catalyzer as above given. It may be, for example, otherwise formed by the decomposition of the double cyanids of its components, such as ferrocyanid of potassium or sodium and ferrocyanid of calcium or magnesia. Such a catalyzer is prepared by mixing these double cyanids, briqueting and drying. In the retorts the cyanids are reduced, at first, to ammonia, and the iron thus formed is very active in the mass. The catalytic mass may also be formed of the metals magnesium, sodium and iron.

In carrying out my method, I first subject the catalyzer to the gaseous mixture at a temperature ranging between 1500 and 1900 degrees Fahr., say about 1800 degrees Fahr. for a period of say about twelve hours. I then lower the temperature to between 600 and 1200 degrees Fahr. and pass the gaseous mixture through it at the lower temperature.

The activity of the catalyzer, after a certain amount of gas has been passed through it at the lower temperature gradually declines and eventually loses its efficiency entirely. When this stage has been reached, or, in fact, any stage at which the yield of ammonia or cyanogen, or both as the case may be, is no longer in commercial quantity, the temperature is again elevated to the higher range, and its activity thereby restored by again passing the gaseous mixture through it, whereupon the temperature is again reduced to the lower range and the operation continued. This procedure is carried out until the catalyzer is so fouled by foreign elements, such as sulfur and carbon, that it must be rejuvenated by lixivation and briqueting.

I claim:—

1. The method of producing cyanogen and ammonia which consists in first subjecting a catalytic mass comprising a metal of the iron group, an alkaline earth, and an alkali, to a gaseous mixture of nitrogen and a substance capable of reacting to form ammonia or cyanogen or both, at a temperature ranging between 1500 and 1900 degrees Fahr., and then subjecting said catalyzer to said gaseous mixture at a temperature ranging between 600 and 1200 degrees Fahr.

2. The method of producing cyanogen and ammonia which consists in first subjecting a catalytic mass comprising a metal, of the iron group, an alkaline earth, and an alkali, to a gaseous mixture of atmospheric air and natural gas at a temperature ranging between 1500 and 1900 degrees Fahr., and then subjecting said catalyzer to said gaseous mixture at a temperature ranging between 600 and 1200 degrees Fahr.

In testimony whereof I have signed my name to this specification in the presence of two subscribing witnesses.

PAUL A. STARKE.

Witnesses:
 WM. F. BOOTH,
 D. B. RICHARDS.